(12) United States Patent
Monaghan et al.

(10) Patent No.: US 10,191,238 B1
(45) Date of Patent: Jan. 29, 2019

(54) FIBER OPTIC CABLE MANAGEMENT KIT AND CHASSIS

(71) Applicant: DMSI International, Venice, FL (US)

(72) Inventors: Riley Monaghan, Titusville, FL (US); Brandon Woodward, Venice, FL (US)

(73) Assignee: DMSI International, Venice, FL (US)

( * ) Notice: Subject to any disclaimer, the term of this patent is extended or adjusted under 35 U.S.C. 154(b) by 0 days.

(21) Appl. No.: 15/831,544

(22) Filed: Dec. 5, 2017

(51) Int. Cl.
*G02B 6/44* (2006.01)

(52) U.S. Cl.
CPC .......... *G02B 6/4452* (2013.01); *G02B 6/4471* (2013.01)

(58) Field of Classification Search
None
See application file for complete search history.

(56) References Cited

U.S. PATENT DOCUMENTS

| 6,870,734 B2 * | 3/2005 | Mertesdorf .......... G02B 6/4452 312/223.2 |
| 2014/0079366 A1 * | 3/2014 | Rodriguez ............... G02B 6/36 385/136 |

* cited by examiner

*Primary Examiner* — Jerry Rahll
(74) *Attorney, Agent, or Firm* — Clements Bernard Walker PLLC

(57) ABSTRACT

A fiber optic cable management kit including a plate having a plurality of slide-lock apertures oriented in various directions, at least one cable tie down adapted to slide-lock engage within the apertures, and at least one fiber organizer adapted to slide-lock engage within the apertures, wherein the kit serves to route and manage fiber optic cable routed within a rear end of a rack-mountable chassis.

13 Claims, 9 Drawing Sheets

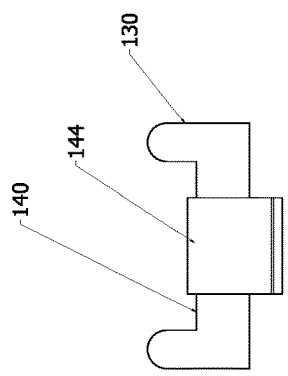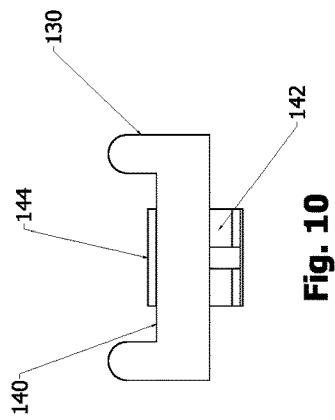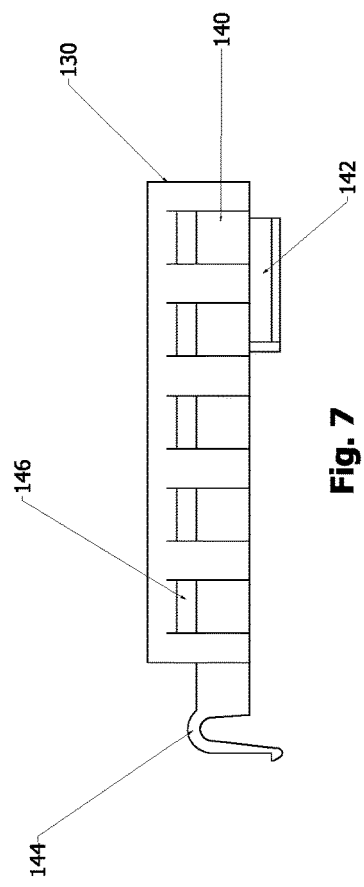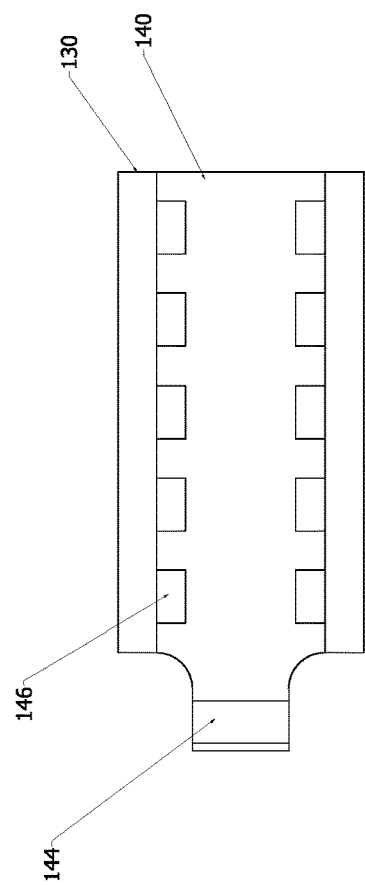

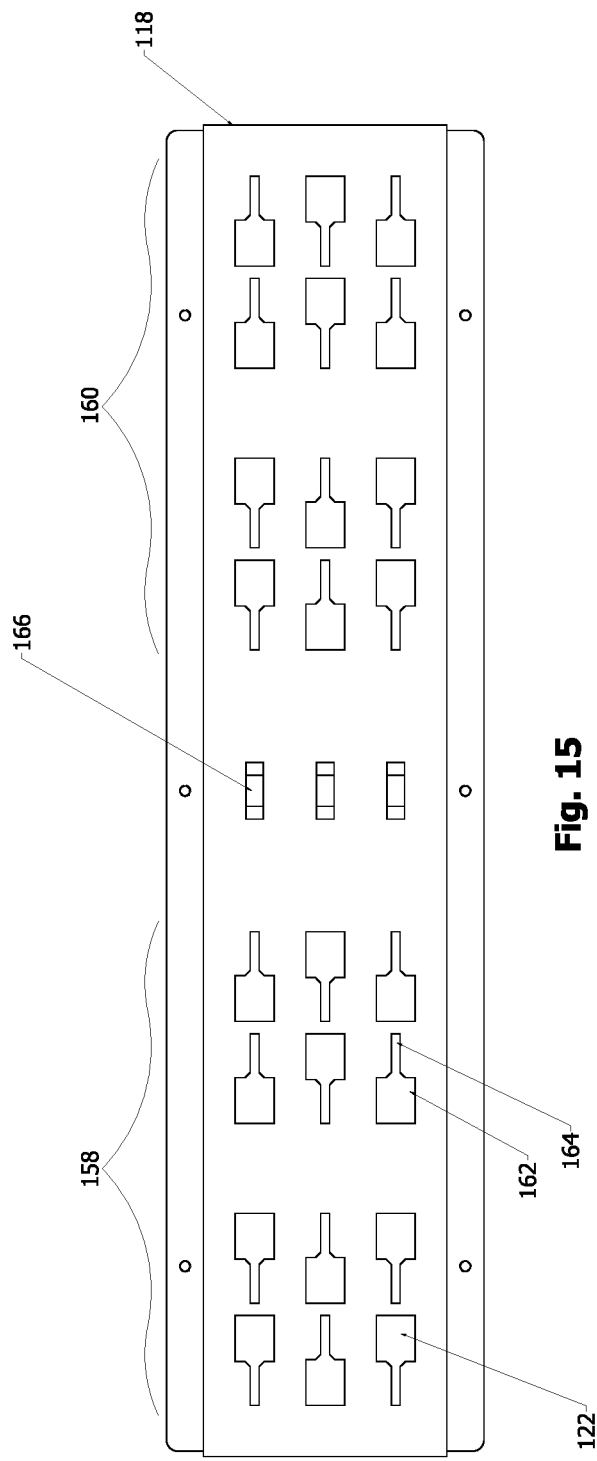

FIBER OPTIC CABLE MANAGEMENT KIT AND CHASSIS

TECHNICAL FIELD AND BACKGROUND

The present invention relates generally to the field of fiber optic cable management, and more particularly, to a kit including a plate having a plurality of slide-lock apertures, at least one cable tie down adapted to slide-lock engage with the plate, and at least one fiber organizer adapted to slide-lock engage with the plate, wherein the kit provides a comprehensive and universal solution for managing fiber optic cable within a rack-mountable chassis.

Rack-mountable chassis can be used to manage fiber optic cables and connectors within fiber optic networks. Each chassis can be configured to manage a predetermined number of cables and connectors, for example, twelve, twenty-four, thirty-six, forty-eight, etc. Each chassis can be equipped with a front access panel that opens to access adapters presented near the front end of the chassis, and can optionally include sliding trays to facilitate better access to the adapters. Adapters are presented at the front end of the chassis for ease in making optical connections, while fiber optic cables extending from the backside of the adapters are managed in the rear end of the chassis. Fiber optic cable can enter through the rear end of the chassis.

Chassis can be configured to handle large numbers of fiber optic connectors and associated cabling. As such, what is needed is a kit of parts for managing whole or divided out cable after entry into the chassis in an efficient and organized manner while maintaining the minimum bend radius of the optical fibers. A desirable kit would include parts for handling different types and numbers of cables encountered in various fiber optic network applications.

SUMMARY

In one aspect, embodiments of the inventive concepts disclosed herein are directed to a plate adapted to be disposed in an elevated position above a chassis floor and including a plurality of slide-lock apertures, a cable tie down adapted to slide-lock engage the plate and including a slide-lock engagement feature and a compliant mechanism each adapted to engage in one of the plurality of slide-lock apertures, the cable tie down further including first and second rows of spaced apertures adapted to receive cable tie downs therethrough, and a fiber organizer adapted to slide-lock engage the plate and including a slide-lock engagement feature and a compliant mechanism each adapted to engage in one of the plurality of slide-lock apertures, the fiber organizer further including a plurality of spaced parallel arcuate walls each capped with a cable retention feature configured to retain at least one cable between adjacent ones of the spaced parallel arcuate walls.

In a further aspect, the plurality of slide-lock apertures can be arranged into a first group of slide-lock apertures and a second group of slide-lock apertures spaced apart from the first group of slide-lock apertures, wherein each of the first and second groups of slide-lock apertures can include first slide-lock apertures oriented in a first direction and second slide-lock apertures oriented in a second direction different from the first direction.

In a further aspect, the first direction can be opposite the second direction.

In a further aspect, the plate can further include at least one integral cable tie down disposed between the first group of slide-lock apertures and the second group of slide-lock apertures.

In a further aspect, the cable tie down can include a base through which the first and second rows of apertures open, the slide-lock engagement feature can extend from a bottom of the base, and the compliant mechanism can extend from one end of the base.

In a further aspect, the fiber organizer can include seven parallel arcuate walls and six parallel slots, with each of the six parallel slots defined between adjacent ones of the seven parallel arcuate walls.

In a further aspect, the fiber organizer can include thirteen parallel arcuate walls and twelve parallel slots, with each of the twelve parallel slots defined between adjacent ones of the thirteen parallel arcuate walls.

In a further aspect, the cable retention feature can include spaced projections each extending perpendicularly from a respective parallel arcuate wall in a direction of an adjacent parallel arcuate wall.

In another aspect, embodiments of the inventive concepts disclosed herein are directed to a fiber optic cable management assembly including a chassis having a front end adapted to manage fiber optic connectors and a rear end adapted to manage fiber optic cable, a plurality of slide-lock apertures disposed in the rear end of the chassis, a cable tie down adapted to slide-lock engage in the rear end of the chassis and including a slide-lock engagement feature and a compliant mechanism each adapted to engage in one of the slide-lock apertures, the cable tie down further including opposing first and second rows of apertures adapted to receive cable tie downs therethrough, and a fiber organizer adapted to slide-lock engage in the rear end of the chassis and including a slide-lock engagement feature and a compliant mechanism each adapted to engage in one of the slide-lock apertures, the fiber organizer further including a plurality of parallel arcuate walls each capped with a cable retention feature configured to retain at least one cable between adjacent ones of the parallel arcuate walls.

In a further aspect, the slide-lock apertures can be disposed through a plate adapted to mount in an elevated position above a floor of the chassis.

In a further aspect, the slide-lock apertures can be arranged into a first group of slide-lock apertures and a second group of slide-lock apertures spaced from the first group of slide-lock apertures, wherein each of the first and second groups of slide-lock apertures can include first slide-slide-lock apertures oriented in a first direction and second slide-lock apertures oriented in a second direction different from the first direction.

In a further aspect, the first direction can be opposite the second direction.

In another aspect, embodiments of the inventive concepts disclosed herein are directed to a fiber optic cable management kit including a metal plate adapted to be mounted to a floor of a chassis and including a raised center section having a plurality of slide-lock apertures arranged into a first group of slide-lock apertures and a second group of slide-lock apertures, each of the first and second groups of slide-lock apertures including first slide-lock apertures oriented in a first direction and second slide-lock apertures oriented in a second direction opposite the first direction, at least one cable tie down adapted to slide-lock engage the metal plate and including a slide-lock engagement feature and a compliant mechanism each adapted to engage in one of the plurality of slide-lock apertures, the cable tie down further including opposing first and second rows of spaced apertures adapted to receive cable tie downs therethrough, and at least one fiber organizer adapted to slide-lock engage the metal plate and including a slide-lock engagement feature and a compliant mechanism each adapted to engage in one of the plurality of slide-lock apertures, the fiber organizer further including a plurality of spaced parallel walls each capped with a cable retention feature configured to retain at least one cable between adjacent ones of the spaced parallel walls.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 7 is a left side view of the cable tie down of FIG. 5;

FIG. 8 is a top view of the cable tie down of FIG. 5;

FIG. 9 is a front view of the cable tie down of FIG. 5;

FIG. 10 is a back view of the cable tie down of FIG. 5;

FIG. 15 is a top view of a plate having slide-lock apertures according to an embodiment of the invention.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed to a kit of parts for managing fiber optic cable within a chassis. More specifically, the kit can include a plate for removably securing in place at least one cable tie down and at least one fiber organizer. The plate is configured to mount, in various orientations, at least one cable tie down and/or at least one fiber organizer. The kit of parts is comprehensive and universal such that the kit can accommodate any desired application in terms of cable type, number of cables, furcation, furcation kit, cable routing configuration, etc. In one particular application, multiple fiber organizers can be utilized to manage and route cables entering from both sides of the chassis. In another application, multiple fiber organizers can be utilized to manage fiber divided out of a single cable entering from one side of the chassis.

Figure 1:
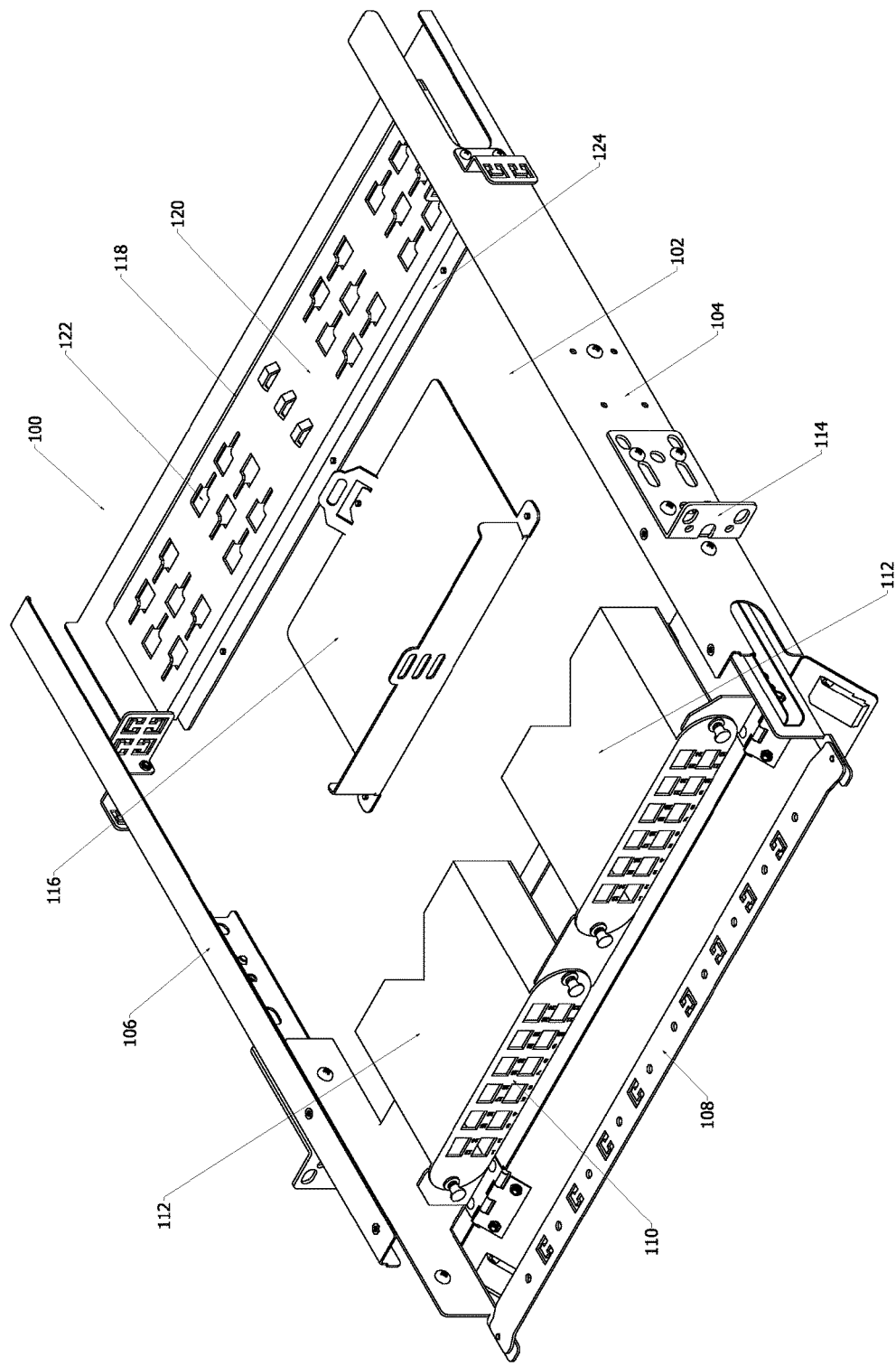
FIG. 1 is a front perspective view of a chassis according to an embodiment of the invention and shown open.

FIG. 1 illustrates a rack-mountable chassis 100 according to a first embodiment of the invention. The chassis 100 generally includes a floor 102, side walls 104, 106, and a front access panel 108. The front access panel 108 can pivot open or can be removable to access a plurality of adapters 110 presented through the front end of the chassis 100. As shown, the adapters 110 are mounted within two modules 112, with each module 112 configured to accommodate, for example, twelve adapters. The modules 112 may be fixed relative to the chassis 100 or may be moveably mounted upon trays, rails, or like guides for guiding movement of the modules relative to the chassis. The chassis 100 can further optionally include one or more brackets 114 for rack mounting the chassis and a splice organizer bracket 116 for mounting a splice organizer within.

A plate 118, as discussed in detail below, is disposed in the rear end or back of the chassis 100. The plate 118 serves to removably mount cable tie downs and/or fiber organizers in a variety or orientations, among other purposes. For example, the plate 118 can be made from stamped metal bent to define a raised center portion 120 having a plurality of slide-lock apertures 122 therethrough. The plate 118 can be permanently fixed to, an integral part of, or removably attached to the chassis floor 102.

The plate 118 in one embodiment can include flanges 124 extending the length of opposing sides of a center portion 120. The flanges 124 can receive fasteners therethrough for securing the plate 118 to the chassis while positioning the center portion 120 elevated above the floor 102. Elevating the plate 118 above the floor 102 provides clearance between the underside of the center portion 120 and the floor 102 for accommodating slide-lock features of components engaged through the slide-lock apertures 122.

Figure 2:
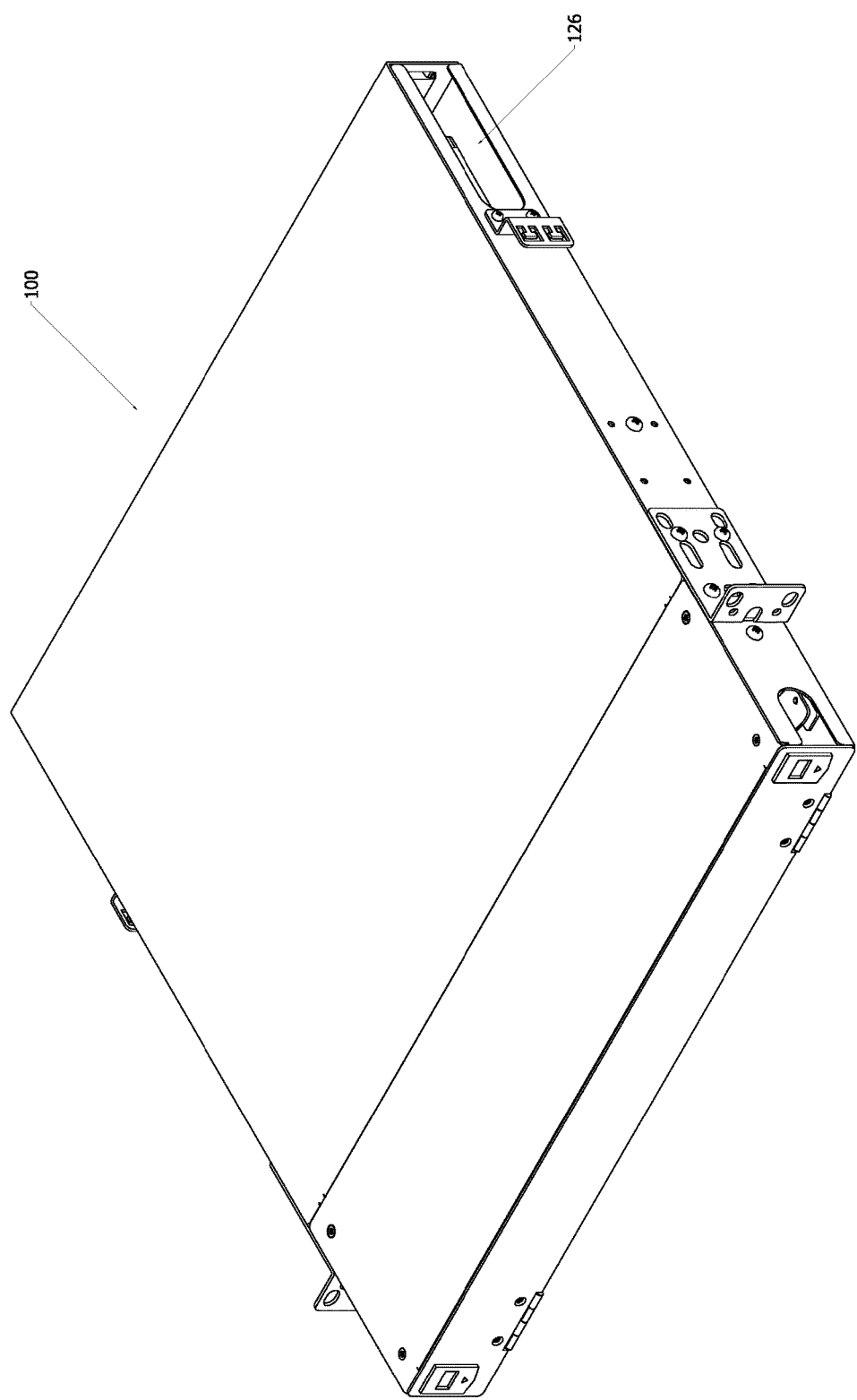
FIG. 2 is a front perspective view of the chassis of FIG. 1 shown closed.

FIG. 2 shows the chassis 100 covered. An opening 126 can be provided along each side of the chassis 100 near the rear end thereof, each opening 126 serving as a cable entry point into the chassis. Thus, one or more fiber optic cables can enter the chassis through the right side, left side or both sides depending on the application, number of fiber optic cables, origination direction of the cable, etc.

Figure 3:
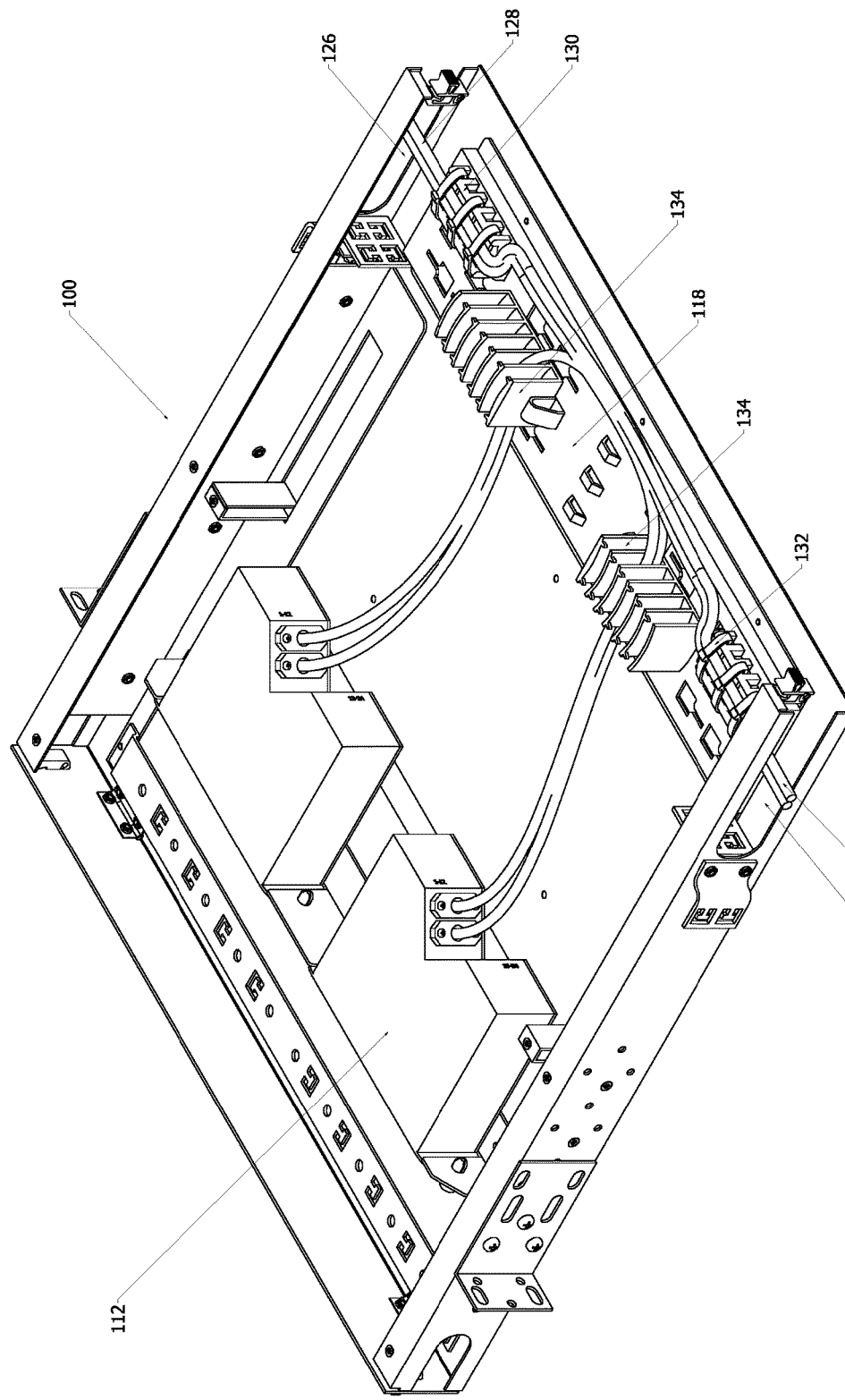
FIG. 3 is a rear perspective view of a chassis showing a fiber optic cable routed to modules through fiber organizers.

FIG. 3 shows the chassis 100 uncovered and with two fiber optic cables 128 entering the chassis through each of the left and right hand openings 126. In the particular configuration shown, a single cable tie down 130 is slide-lock attached near each side opening 126, and each pair of fiber optic cables 128 is secured to a respective one of the cable tie downs 130 using tie downs 132 (e.g., zip ties or other fasteners) installed through opposing openings through the tie down. Each pair of fiber optic cables 128 is routed to a fiber organizer 134 spaced apart from the same cable pairs cable tie down 130. Each cable pair 128 is routed through a slot in a respective fiber organizer 134 and guides the cable pair in a direction of one of the modules 112. The cable pairs 128 enter the modules through dedicated openings and can be divided out within the module 112.

The chassis 100 is configured with the plate 118, two cable tie downs 130, and two fiber organizers 134 for accommodating two pairs of fiber optic cables 128, with each cable pair entering through one side of the chassis 100. The cable tie down 130 and fiber organizer 134 dedicated for each cable pair are spaced apart on the plate 118 such that the cable pair entering through the "left" side of the chassis is ultimately routed to the "right" side module 112, and the cable pair entering through the "right" side of the chassis is ultimately routed to the "left" side module 112. As discussed in detail below, the plate 118 is configured with multiple slide-lock apertures to provide installation flexibility in the number and position of the cable tie downs and fiber organizer components that can be mounted to the plate.

Figure 4:
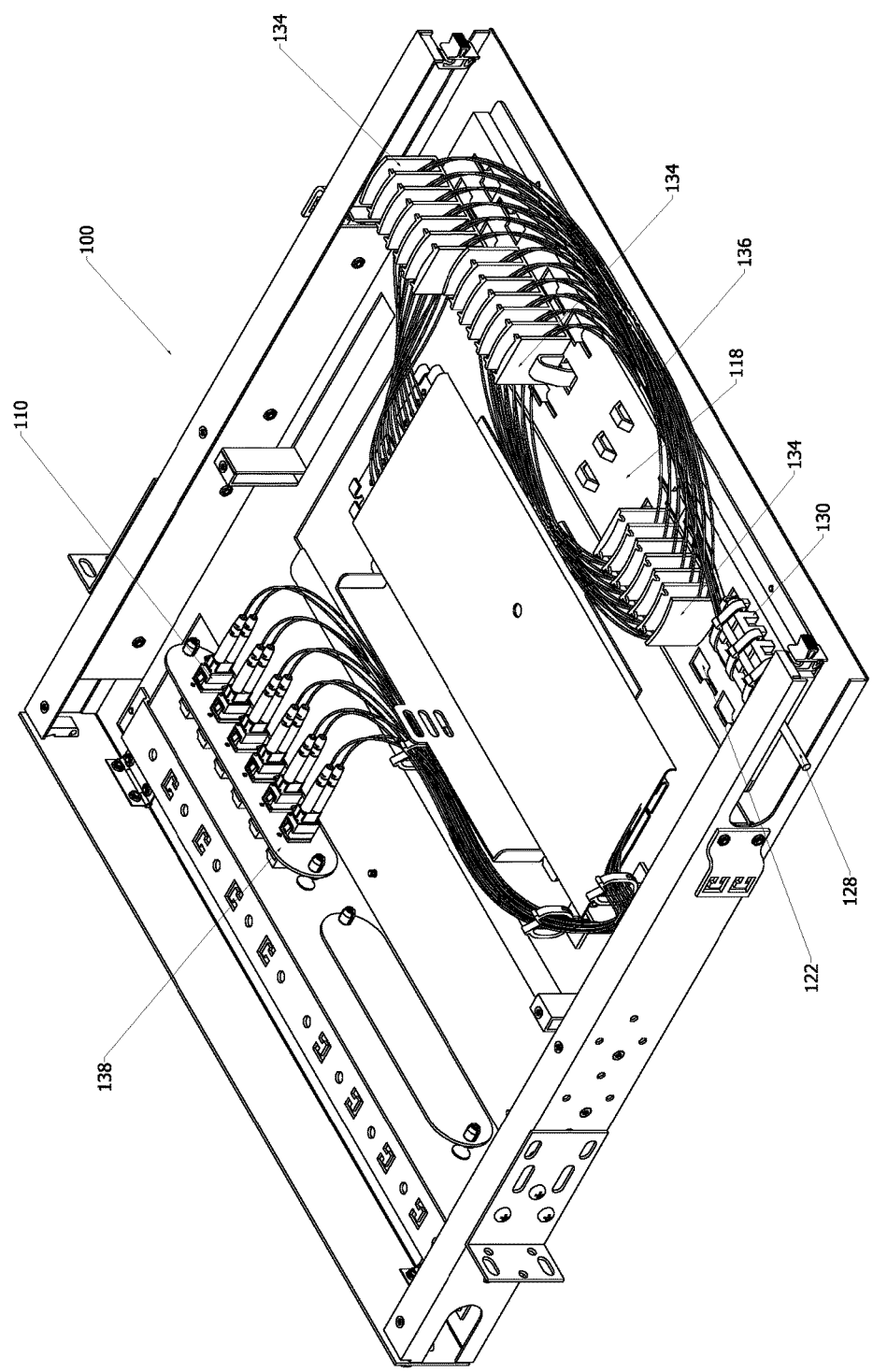
FIG. 4 is a rear perspective view of a chassis showing a fiber optic cable divided out, connectorized, and routed to adapters through fiber organizers.
Figure 6:
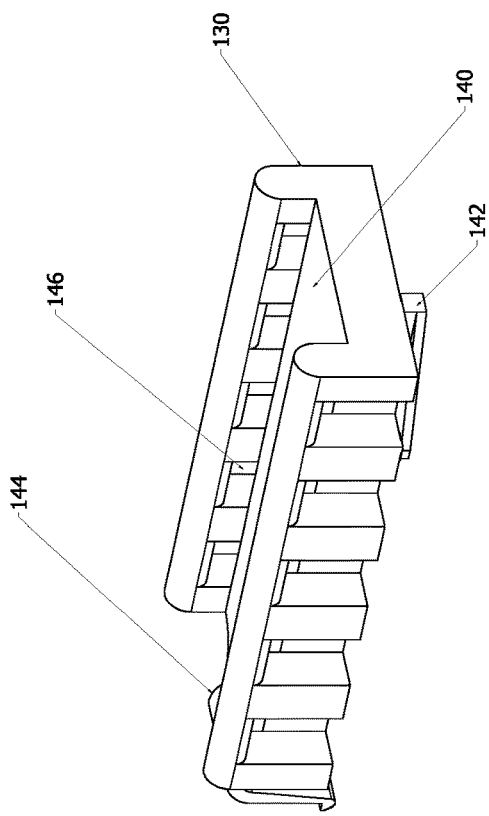
FIG. 6 is a rear perspective view of the cable tie down of FIG. 5.
Figure 5:
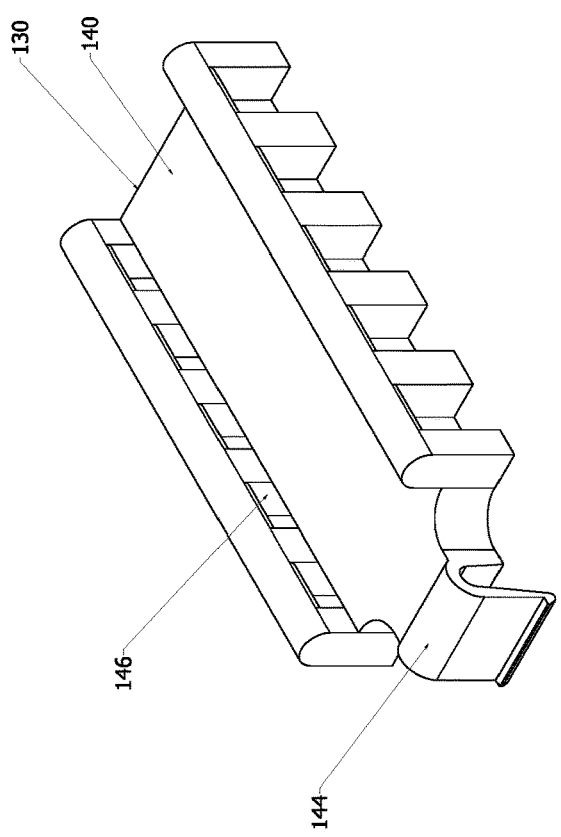
FIG. 5 is a front perspective view of a cable tie down according to an embodiment of the invention.
Figure 12:
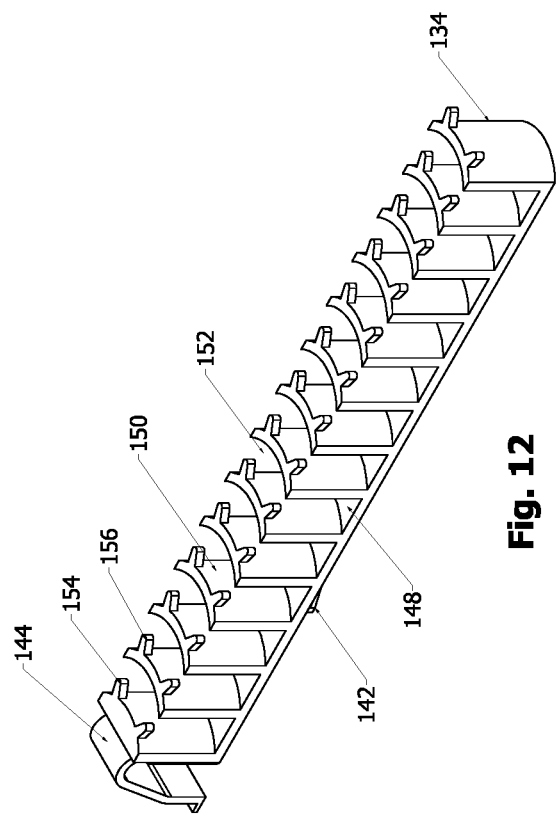
FIG. 12 is a perspective view of a fiber organizer according to a second embodiment of the invention.
Figure 11:
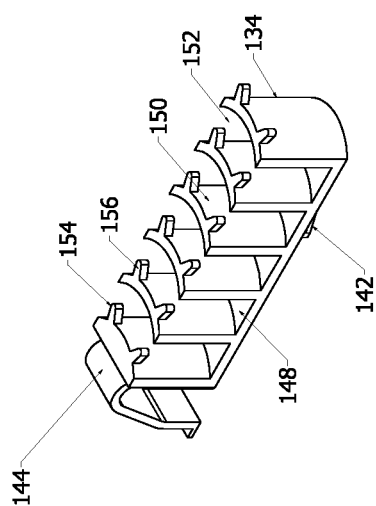
FIG. 11 is a perspective view of a fiber organizer according to a first embodiment of the invention.
Figure 14:
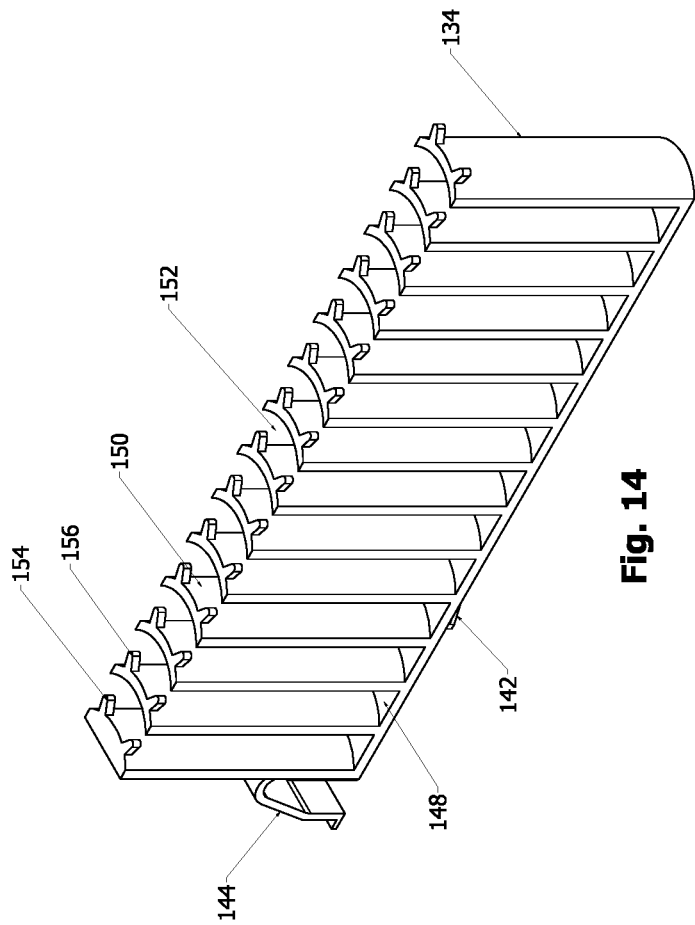
FIG. 14 is a perspective view of a fiber organizer according to a fourth embodiment of the invention.
Figure 13:
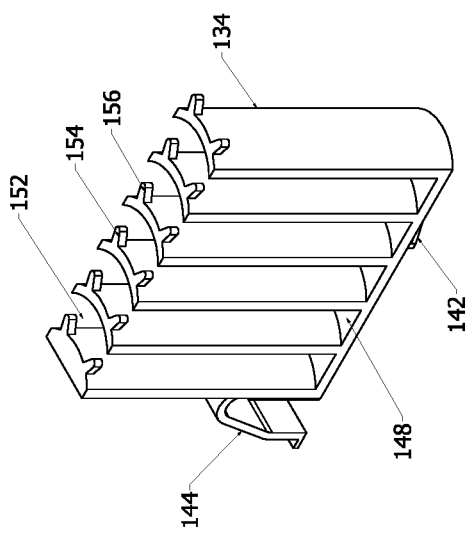
FIG. 13 is a perspective view of a fiber organizer according to a third embodiment of the invention.

FIG. 4 shows an alternative configuration in which a single fiber optic cable 128 enters the chassis 100 through one side of the chassis. A single cable tie down 130 is slide-lock attached adjacent the opening 126 through which the cable enters, and the cable 128 is secured to cable tie down 130 using tie downs or other attachment means. The cable 128 is divided out downstream of the cable tie down 130 and the divided out fibers 136 are routed through each of first, second, and third fiber organizers 134. The first, second, and third fiber organizers 134 are spaced apart and arranged such that a length of the divided fibers 136 can be looped, managed, and ultimately routed in a direction of the front end of the chassis where the connectorized fibers engage in the backside of a plurality of adapters 110 mounted in a vertical plate 138.

Two of the fiber organizers 134 are shown secured within the same row of spaced slide-lock apertures 122 in a facing arrangement such that the curvature of the slot-defining walls of the fiber organizers promotes a gradual loop in the routed fibers. The third fiber organizer 134 is positioned in an adjacent row outside the fiber loop to guide the fibers in a direction of the front end of the chassis. The number of fiber organizers 134 and number of slots of each fiber organizer can be selected based on the number of divided fibers to be managed and assigned to each slot.

FIGS. 5-10 illustrate a cable tie down 130 according to an exemplary embodiment. The cable tie down 130 generally includes a base 140, at least one slide-lock engagement feature 142, and a compliant mechanism 144. The base 140 defines a plurality of openings 146 along opposing sides thereof for receiving tie downs therethrough. Each tie down can be threaded through aligned openings on opposing sides of the base 140 such that the tie downs span the base to secure one or more cables atop the base. A channel is provided atop the base for maintaining the one or more cables between raised sidewalls extending above the base.

Each slide-lock engagement feature 142 extends away from the bottom of the base 140 and is shaped and oriented to slide-lock engage within a slide-lock apertures of the plate. The embodiment shown includes two slide-lock engagement features 142 aligned and spaced to engage within adjacent slide-lock apertures within the same row of apertures on the plate. The compliant mechanism 144 extends from one end of the base 144 and is shaped to engage within a adjacent slide-lock aperture in the same row of slide-lock apertures utilized by the slide-lock engagement feature of the cable tie down 130. The compliant mechanism 144 can be resiliently deformable and shaped to bias the base 140 in a slide-locked direction of the slide-lock apertures. Thus, in the cable tie down 130 embodiment shown, three adjacent slide-lock apertures in the base are utilized simultaneously to secure the cable tie down to the plate.

FIGS. 11-14 illustrate various lengths of fiber organizers 134. Each fiber organizer 134 generally includes an elongate base 148, a plurality of spaced upstanding parallel walls 150, at least one slide-lock engagement feature 142, and a compliant mechanism 144. The at least one slide-lock engagement feature 142 and compliant mechanism 144 can be the same as or similar to those on the cable tie down. Thus, any of the cable tie downs and fiber organizers can be interchangeably located anywhere on the plate.

Each of the upstanding walls 150 can be arcuate shaped to help promote the gradual curvature of cables or fibers routed through slots 152 between adjacent walls 150. The walls 150 and slots 152 can be equally spaced apart along the base 148. Each wall 150 can be capped with a retention feature 154 for retaining at least one cable or fiber within the slot below. As shown, the retention feature 154 can include spaced projections 156 each extending perpendicularly from a respective wall partway in a direction of an adjacent wall.

Fiber organizers 134 can have any length of repeating wall/slot units depending on the application and number of slots needed. For example, fiber organizers 134 can have 1, 2, 3, 4, 5, 6, 7, 8, 9, 10, 11, 12 . . . n number of slots, and wall height can be increased or decreased depending on the number and diameter of cables and/or fibers routed through the fiber organizers.

FIG. 15 illustrates a plate 118 having a plurality of slide-lock apertures 122 arranged into a first group of slide-lock apertures 158 and a second group of slide-lock apertures 160 spaced apart from the first group of slide-lock apertures, wherein each of the first and second groups of slide-lock apertures 158, 160 include first slide-lock apertures oriented in a first direction and second slide-lock apertures oriented in a second direction different from the first direction, for example, oriented in opposite directions. The first and second groups of slide-lock apertures can be further divided into sub-groups of slide-lock apertures. Aperture orientations can be different within or between rows, columns, groups, and sub-groups.

Each slide-lock aperture 122 generally includes a first portion 162 through which the slide-lock engagement feature 142 enters the aperture, and a second portion 164 in which the slide-lock feature is retained to prevent the component from being pulled apart from the plate 118 in a direction perpendicular to the face of the center portion 120. At least one tie down 166 can be disposed intermediate the first and second groups of slide-lock apertures.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A fiber optic cable management kit, comprising:
   a plate adapted to secure to a chassis floor, the plate comprising a plurality of slide-lock apertures disposed through a top face of the plate, the plurality of slide-lock apertures comprising a first group of slide-lock apertures and a second group of slide-lock apertures spaced apart from the first group of slide-lock apertures, wherein each of the first and second groups of slide-lock apertures comprise first slide-lock apertures oriented in a first direction and second slide-lock apertures orientated in a second direction opposite the first direction;
   a cable tie down adapted to slide-lock engage the plate, the cable tie down comprising a slide-lock engagement feature and a compliant mechanism each adapted to engage in one of the plurality of slide-lock apertures of the plate, the cable tie down further comprising opposing first and second rows of spaced apertures adapted to receive cable tie downs therethrough; and a fiber organizer adapted to slide-lock engage the plate, the fiber organizer comprising a slide-lock engagement feature and a compliant mechanism each adapted to engage in one of the plurality of slide-lock apertures of the plate, the fiber organizer further comprising a plurality of spaced parallel arcuate walls each capped with a cable retention feature configured to retain at least one cable between adjacent ones of the spaced parallel arcuate walls, the cable retention feature comprising first and second spaced projections extending perpendicularly from a respective parallel arcuate wall in a direction of an adjacent parallel arcuate wall.

2. The fiber optic cable management assembly of claim 1, wherein the fiber organizer comprises thirteen parallel arcuate walls and twelve parallel slots, each of the twelve parallel slots defined between adjacent ones of the thirteen arcuate walls.

3. The fiber optic cable management kit of claim 1, wherein the fiber organizer comprises thirteen parallel arcuate walls and twelve parallel slots, each of the twelve parallel slots defined between adjacent ones of the thirteen parallel arcuate walls.

4. The fiber optic cable management kit of claim 1, wherein the plate further comprises at least one integral cable tie down disposed between the first group of slide-lock apertures and the second group of slide-lock apertures.

5. The fiber optic cable management kit of claim 1, wherein the cable tie down comprises a base through which the first and second rows of apertures open, wherein the slide-lock engagement feature extends from a bottom of the base, and wherein the compliant mechanism extends from one end of the base.

6. The fiber optic cable management kit of claim 1, wherein the fiber organizer comprises seven parallel arcuate walls and six parallel slots, each of the six parallel slots defined between adjacent ones of the seven parallel arcuate walls.

7. A fiber optic cable management assembly, comprising:
a chassis comprising a front end adapted to manage fiber optic connectors and a rear end adapted to manage fiber optic cable;
a plurality of slide-lock apertures disposed in the rear end of the chassis, the plurality of slide-lock apertures comprising a first group of slide-lock apertures and a second group of slide-lock apertures spaced apart from the first group of slide-lock apertures, wherein each of the first and second groups of slide-lock apertures comprise first slide-lock apertures oriented in a first direction and second slide-lock apertures oriented in a second direction opposite the first direction;
a cable tie down adapted to slide-lock engage in the rear end of the chassis, the cable tie down comprising a slide-lock engagement feature and a compliant mechanism each adapted to engage in one of the plurality of slide-lock apertures, the cable tie down further comprising opposing first and second rows of apertures adapted to receive cable tie downs therethrough; and
a fiber organizer adapted to slide-lock engage in the rear end of the chassis, the fiber organizer comprising a slide-lock engagement feature and a compliant mechanism each adapted to engage in one of the plurality of slide-lock apertures, the fiber organizer further comprising a plurality of parallel arcuate walls each capped with a cable retention feature configured to retain at least one cable between adjacent ones of the parallel arcuate walls, the cable retention feature comprising first and second spaced projections extending perpendicularly from a respective parallel arcuate wall in a direction of an adjacent parallel arcuate wall.

8. The fiber optic cable management assembly of claim 7, wherein the plurality of slide-lock apertures are disposed through a plate adapted to mount in an elevated position above a floor of the chassis.

9. The fiber optic cable management assembly of claim 7, wherein the cable tie down comprises a base through which the first and second rows of apertures open, wherein the slide-lock engagement feature extends from a bottom of the base, and wherein the compliant mechanism extends from one end of the base.

10. The fiber optic cable management assembly of claim 7, wherein the fiber organizer comprises seven parallel arcuate walls and six parallel slots, each of the six parallel slots defined between adjacent ones of the seven parallel arcuate walls.

11. A fiber optic cable management kit, comprising:
a metal plate adapted to be mounted to a floor of a chassis, the metal plate comprising a raised center section comprising a plurality of slide-lock apertures arranged into a first group of slide-lock apertures and a second group of slide-lock apertures, each of the first and second groups of slide-lock apertures comprising first slide-lock apertures oriented in a first direction and second slide-lock apertures oriented in a second direction opposite the first direction;
at least one cable tie down adapted to slide-lock engage the metal plate, the cable tie down comprising a slide-lock engagement feature and a compliant mechanism each adapted to engage in one of the plurality of slide-lock apertures, the cable tie down further comprising opposing first and second rows of spaced apertures adapted to receive cable tie downs therethrough; and
at least one fiber organizer adapted to slide-lock engage the metal plate, the fiber organizer comprising a slide-lock engagement feature and a compliant mechanism each adapted to engage in one of the plurality of slide-lock apertures, the fiber organizer further comprising a plurality of spaced parallel walls each capped with a cable retention feature configured to retain at least one cable between adjacent ones of the spaced parallel walls, the cable retention feature comprising first and second spaced projections extending perpendicularly from a top of a respective parallel arcuate wall in a direction of an adjacent parallel arcuate wall.

12. The fiber optic cable management kit of claim 11, wherein the at least one fiber organizer comprises seven parallel walls and six parallel slots, each of the six parallel slots defined between adjacent ones of the seven parallel walls.

13. The fiber optic cable management kit of claim 11, wherein the fiber organizer comprises thirteen parallel walls and twelve parallel slots, each of the twelve parallel slots defined between adjacent ones of the thirteen parallel walls.

* * * * *